UNITED STATES PATENT OFFICE.

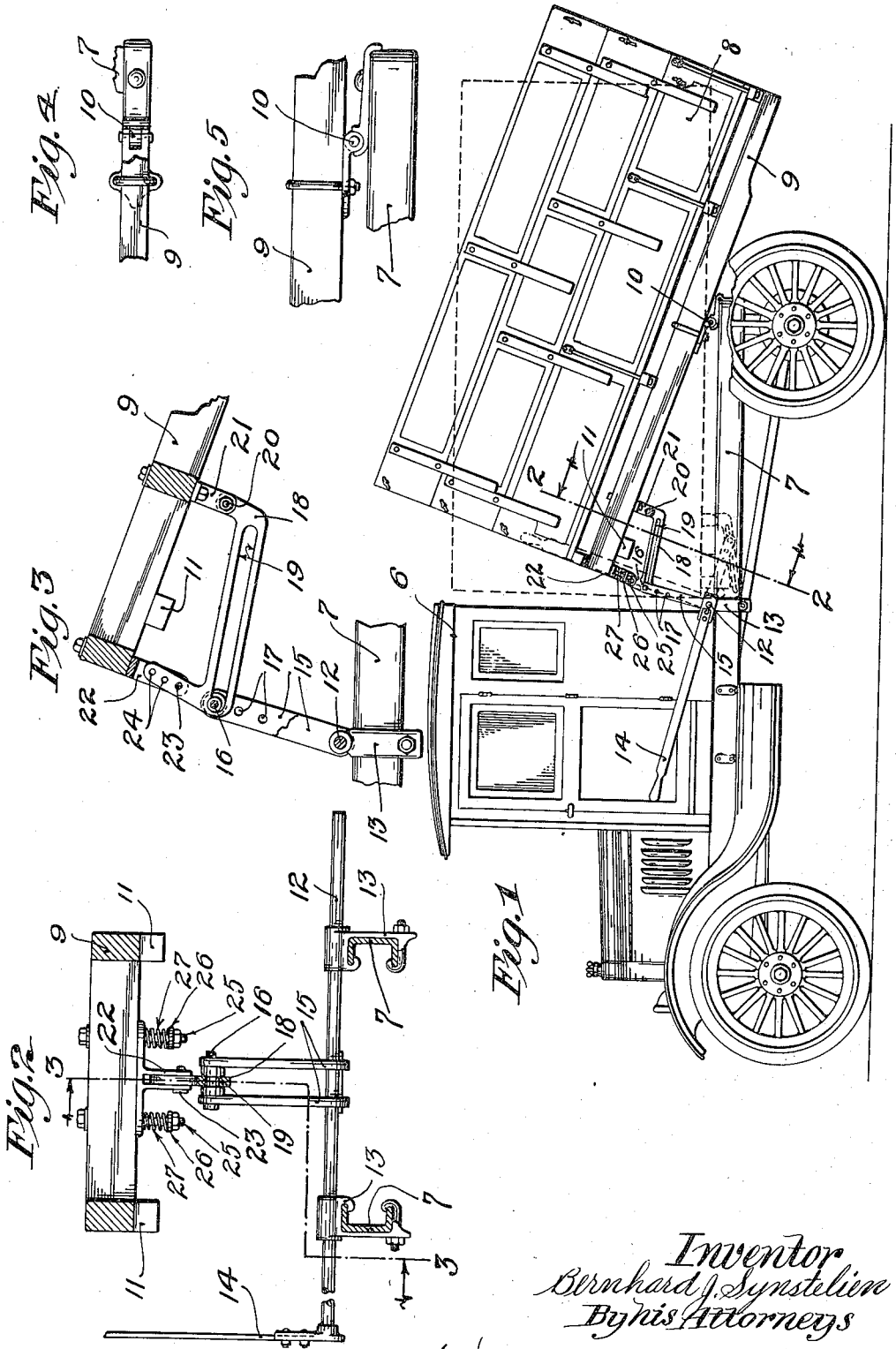

BERNHARD J. SYNSTELIEN, OF FONDA, IOWA.

COMBINED LOCKING AND LIFTING DEVICE FOR TRUCK-BODIES.

1,342,472.   Specification of Letters Patent.   Patented June 8, 1920.

Application filed October 25, 1919. Serial No. 333,265.

*To all whom it may concern:*

Be it known that I, BERNHARD J. SYNSTELIEN, a citizen of the United States, residing at Fonda, in the county of Pocahontas and State of Iowa, have invented certain new and useful Improvements in Combined Locking and Lifting Devices for Truck-Bodies; and I do hereby declare the following to be a full, clear, and exact description of the invention, such as will enable others skilled in the art to which it appertains to make and use the same.

My invention relates to improvements in trucks having dumping bodies, and has for its object to provide a combined locking and lifting device for such bodies.

To the above end, the invention consists of the novel devices and combinations of devices hereinafter described and defined in the claims.

In the accompanying drawings, which illustrate the invention, like characters indicate like parts throughout the several views.

Referring to the drawings:—

Figure 1 is a view in side elevation with the truck body shown in a dumping position by means of full lines and in a normal position by means of broken lines;

Fig. 2 is a fragmentary view in transverse vertical section taken on the line 2—2 of Fig. 1, on an enlarged scale;

Fig. 3 is a detail view in longitudinal vertical section taken on the line 3—3 of Fig. 2;

Fig. 4 is a fragmentary plan view of one of the hinge connections between the truck frame and body, on an enlarged scale; and Fig. 5 is an elevation of the parts shown in Fig. 4.

The numeral 6 indicates, as an entirety, a motor-driven truck, with the exception of its frame 7, on which is mounted a dumping body 8, the frame or bed of which is indicated by the numeral 9. The body bed 9 is attached to the truck frame 7 by a pair of hinges 10 for rearward dumping action. These hinges 10 are designed to carry the load without putting any strain on the hinge pins thereof. On the under side of the body bed 9 is a pair of blocks 11 arranged to rest on the side members of the truck frame 7 and support the front end of the body 8 thereon in a normal position.

Referring now in detail to the invention, the numeral 12 indicates a transverse rock-shaft located directly under the front end of the body 8 and journaled in a pair of bearings 13. It will be noted that the bearings 13 are frictionally clamped to the side channel members of the truck frame 7, thus avoiding the drilling of holes for bolts or other fastening means which would weaken said frame. Attached to the left-hand end of the rock-shaft 12 is a hand lever 14 provided for operating said rock-shaft. It may be here stated that the hand lever 14 may be applied to either end of the rock-shaft 12, as convenient to the operator.

Keyed to the intermediate portion of the rock-shaft 12 is a pair of laterally spaced crank arms 15. A roller-equipped crank pin 16, located between the crank arms 15 at the outer ends thereof, is adjustably attached thereto, to afford a variable throw crank, by forming in said arms a plurality of longitudinally spaced pairs of bores 17 to receive said crank pin.

The crank arms 15 are connected to the bed 9 by a bracket 18 having formed therein a longitudinally extended cam slot 19 into which the roller-equipped crank pin 16 is arranged to travel. The rear end of the bracket 18 is pivoted at 20 for vertical swinging movement to and between the prongs of a bearing 21 rigidly secured to the bed 9, and the front end of said bracket extends between the prongs of a bearing 22. The bracket 18 is adjustably attached to the bearing 22 by a bolt 23 which extends through alined bores in the prongs of said bearing and any one of a plurality of bores 24 in said bracket. Obviously, by adjusting the bolt 23 in the different bores 24, the inclination of the cam slot 19 may be varied at will in respect to the plane of the bed 9.

The bearing 22 is attached to the bed 9 by a pair of depending bolts 25 which extend through the front end member of said bed and have on their lower ends adjustable washer-equipped nuts 26, between which and the bracket 22 are compressed coiled springs 27 which encircle said bolts. The purpose of these springs 27 is to afford a cushion between the truck frame 7 and the bed 9 during the dumping action of the body 8.

By reference to Fig. 3, it will be noted that the crank pin 16 engages the front end of the cam slot 19 as a stop when the body 8 is in its uppermost dumping position, and in which position of the body said crank pin is slightly beyond a dead center to lock the body 8 in a raised or dumping position. When the body 8 is in a normal position, the crank pin 16 is so near a dead center as to form a lock to hold said body against dumping movement. It will also be noted that the hinges 10 are located rearward of the longitudinal center of the body 8 to further assist in holding said body against dumping movement.

From the above description, it is evident that, by moving the hand lever 14 rearward, the body 8 may be unlocked from the truck frame 7 and lifted into a dumping position, and then, by a forward movement of said lever, the body 8 may be returned to normal position.

What I claim is:—

1. The combination with a truck frame, of a dumping body hinged to the truck frame, a rock-shaft journaled on the truck frame, a crank arm on the rock-shaft having at its outer end a crank pin, means for oscillating the rock-shaft, and a bracket on the body having a cam slot in which the cam pin works.

2. The combination with a truck frame, of a dumping body hinged to the truck frame, a rock-shaft journaled on the truck frame, a crank arm on the rock-shaft having at its outer end a crank pin, means for oscillating the rock-shaft, and a bracket on the body having a cam slot in which the cam pin works, said bracket being adjustable to change the inclination of its cam slot in respect to the plane of the body.

3. The combination with a truck frame, of a dumping body hinged to the truck frame, a rock-shaft journaled on the truck frame, a crank arm on the rock-shaft having at its outer end a crank pin, means for oscillating the rock-shaft, and a bracket on the body having a cam slot in which the cam pin works, said crank pin being arranged to move in the cam slot past a dead center to lock the truck body in a dumping position.

4. The combination with a truck frame, of a dumping body hinged to the truck frame, a rock-shaft journaled on the truck frame, a crank arm on the rock-shaft having at its outer end a crank pin, means for oscillating the rock-shaft, and a bracket on the body having a cam slot in which the cam pin works, said bracket being pivoted at its rear end to the body and yieldingly connected thereto at its front end.

5. The combination with a truck frame, of a dumping body hinged to the truck frame, a rock-shaft journaled on the truck frame, a crank arm on the rock-shaft having at its outer end a variable throw crank pin, means for oscillating the rock-shaft, and a bracket on the body having a cam slot in which the cam pin works.

In testimony whereof I affix my signature in presence of two witnesses.

BERNHARD J. SYNSTELIEN.

Witnesses:
L. C. PATTEE,
C. B. McCOSTAN.